United States Patent
Holst et al.

(10) Patent No.: US 11,999,881 B2
(45) Date of Patent: Jun. 4, 2024

(54) TWO-COMPONENT STRUCTURAL ADHESIVES

(71) Applicant: GLUE TEC INDUSTRIEKLEBSTOFFE GMBH & CO. KG, Greußenheim (DE)

(72) Inventors: Marco Holst, Greußenheim (DE); Lutz Schmalstieg, Cologne (DE)

(73) Assignee: GLUE TEC INDUSTRIEKLEBSTOFFE GMBH & CO. KG, Greußenheim (DE)

( * ) Notice: Subject to any disclaimer, the term of this patent is extended or adjusted under 35 U.S.C. 154(b) by 959 days.

(21) Appl. No.: 15/733,487

(22) PCT Filed: Nov. 21, 2018

(86) PCT No.: PCT/EP2018/082083
§ 371 (c)(1),
(2) Date: Aug. 7, 2020

(87) PCT Pub. No.: WO2019/154535
PCT Pub. Date: Aug. 15, 2019

(65) Prior Publication Data
US 2021/0102103 A1    Apr. 8, 2021

(30) Foreign Application Priority Data
Feb. 9, 2018 (DE) .................. 10 2018 202 050.7

(51) Int. Cl.
| | |
|---|---|
| *C09J 175/12* | (2006.01) |
| *C08G 18/32* | (2006.01) |
| *C08G 18/79* | (2006.01) |
| *C09J 175/02* | (2006.01) |
| *C09J 175/04* | (2006.01) |

(52) U.S. Cl.
CPC ........ *C09J 175/12* (2013.01); *C08G 18/3234* (2013.01); *C08G 18/3262* (2013.01); *C08G 18/792* (2013.01); *C09J 175/02* (2013.01); *C09J 175/04* (2013.01)

(58) Field of Classification Search
CPC ...... C09J 175/12; C09J 175/02; C09J 175/04; C08G 18/3234; C08G 18/792; C08G 18/3262
See application file for complete search history.

(56) References Cited

U.S. PATENT DOCUMENTS

| | | |
|---|---|---|
| 9,499,654 B2 | 11/2016 | Nakao et al. |
| 9,683,152 B2 | 6/2017 | Kelch et al. |
| 2007/0066786 A1* | 3/2007 | Hanson ............. C08G 18/3234 528/68 |

FOREIGN PATENT DOCUMENTS

| | | | |
|---|---|---|---|
| CA | 2214625 A1 | 3/1998 | |
| EP | 1403245 A1 * | 3/2004 | ........... C07C 229/24 |
| EP | 1516886 A1 * | 3/2005 | ......... C08G 18/3821 |
| EP | 2871194 A1 * | 5/2015 | ............. C08G 18/10 |

OTHER PUBLICATIONS

European Patent Office in connection with PCT/EP2018/082083 filed Nov. 21, 2018, "International Search Report", 4 pages, mailed Feb. 27, 2019.

* cited by examiner

*Primary Examiner* — Rabon A Sergent
(74) *Attorney, Agent, or Firm* — McKee, Voorhees & Sease, PLC

(57) ABSTRACT

The present invention relates to a method for bonding substrates of the same or different type using two-component structural adhesives on the basis of aliphatic polyisocyanates and polyaspartic acid esters, and to a two-component structural adhesive, which contains said two components and has a high strength when hardened.

21 Claims, No Drawings

TWO-COMPONENT STRUCTURAL ADHESIVES

The present invention relates to a method for bonding together identical or different substrates with two-component structural adhesives based on aliphatic polyisocyanates and polyaspartic acid esters, and to a two-component structural adhesive which comprises these two components and exhibits high strength in the cured state.

Reactive two-component adhesives (also referred to below as "2K adhesives") are widely used for the structural adhesive bonding of substrates.

During structural adhesive bonding, identical or different substrates are permanently connected to one another, wherein the components as bonded together usually function as a constructive element.

Structural adhesives have a comparatively large internal strength cohesion and, at the same time, good adhesion to the substrate. A substantial advantage of two-component structural adhesives is the relatively rapid curing, without any limitation in regard to layer thickness, and the absence of organic solvents. Therein, the curing process only is dependent on the temperature and is essentially independent of the humidity or oxygen content of the environment.

As a limitation vis-à-vis elastic adhesives and sealants, structural adhesives in the context of the present application are characterized by a tensile shear strength on roughened V2A steel according to DIN/EN 1465 (2009-07) of at least 7 MPa, preferably at least 10 MPa, more preferably at least 12 MPa.

Essentially three different product groups have been established as two-component structural adhesives as known form the prior art:
- two-component epoxy resin adhesives based on a polyepoxide component and a polyamine and/or polymer captane component,
- two-component acrylate adhesives based on acrylate copolymers, which are radically cured with a peroxide component, and
- two-component polyurethane adhesives based on a polyisocyanate component and a polyol and/or polyamine component.

Because of their variable property profile and their excellent adhesion to a variety of substrates, two-component epoxy resin adhesives form the most important class of structural adhesives. However, their comparatively slow hardening, in particular at lower temperatures, is problematic for this class of structural adhesives. These adhesives no longer cure reliably below a temperature of about 8° C.

On the other hand, two-component acrylate adhesives cure significantly more quickly. However, the presence of odor-intensive and hazardous acrylate monomers, such as, for example, methyl methacrylate, cyclohexyl methacrylate or tetrahydrofurfuryl methacrylate, is regarded as disadvantageous for these structural adhesives. The relatively unfavourable ratio between the correction time, on the one hand, and sufficient assembly stability, on the other hand is also problematic for these structural adhesives.

Two-component polyurethane adhesives can be formulated in various manners and can therefore be used in a particularly versatile manner as structural adhesives. Owing to their high reactivity, aromatic isocyanates are predominantly used in reactive structural adhesives. The monomeric aromatic diisocyanates diphenylmethane diisocyanate—MD—and toluylene diisocyanate—TDI—have cancerogenic properties, as a result of which their use is strictly limited. The hydrolysis products of the monomeric diisocyanates, aromatic diamines, are also cancerogenic and are released by migration out of the adhesives. Nowadays, low-monomer polyisocyanates based on TDI and/or MDI, which are produced by oligomerisation or prepolymerisation of these isocyanates and are freed of monomeric diisocyanates by subsequent thin-layer distillation, are therefore used in many cases. The polyisocyanates and/or isocyanate prepolymers thus obtained are usually highly viscous or resinous, so that the products can be processed into adhesives only with the aid of solvents or plasticizers, which is disadvantageous in terms of adhesive and environmental aspects.

On the other hand, aliphatic, low monomer content polyisocyanates based on isophorone diisocyanate and/or hexamethylene diisocyanate are physiologically more favorable but have a significantly lower reactivity compared to the aromatic isocyanates, so that the curing of the adhesives is comparatively slow. Thus, aliphatic polyisocyanates have hitherto only been used for structural adhesive bonding in special applications.

Two-component polyurethane adhesives contain, as the second component, polyols such as, for example, polyester polyols, polyether polyols, polycarbonate polyols or low molecular weight polyalcohols. Since the reaction with the polyisocyanates proceeds relatively slowly, catalysts for accelerating the curing must generally be added. Some of these are toxic organo-tin compounds or strongly basic tertiary amine compounds. Even when said catalyst systems are used, the curing speed is not sufficient or at least in need of improvement to be suitable for many modern production methods.

A substantially faster curing is achieved if the aforementioned polyols are partially or completely replaced by aromatic polyamine compounds. The polyaddition of the aromatic amines to the polyisocyanates takes place in the range of minutes, so that structural adhesives can be formulated with the aid of this technology, which structural adhesives have a favourable ratio of correction time, on the one hand, to assembly stability, on the other hand. A disadvantage of these adhesives is the strong tendency to yellowing and poor reactivity at temperatures below about 5° C.

A review of structural adhesives can be found, for example, in Bodo Müller and Walter Rath, *Formulation of Adhesive and Sealing Materials*, 3. Edition, Vincentz Network 2015, page 107 ff.

A further class of curable two-component systems is based on aliphatic polyisocyanates and amine-functional aspartic acid esters such as can be obtained by adding maleic acid and/or fumaric acid esters to polyamines. These are known, in principle, as paints and coating systems and are described, for example, in the following patent applications: EP 403 921, EP 0 573 860, U.S. Pat. No. 6,605,684, EP 1 767 559, WO 2001/007504, WO 2001/007399, U.S. Pat. No. 6,458,293, EP 1 426 397. DE 10 2006 002 153 A1 or WO 2004/033517 as well as in more recent patent applications EP 3 098 247 A1 and EP 3 115 388 A1. However, these applications do not provide any guidance how to possibly use such coating systems in structural adhesive bonding WO 2009/003596 relates to medical adhesives based on hydrophilic polyisocyanate prepolymers for surgery, in particular as tissue adhesives. WO 2011/138274 relates to polyisocyanate prepolymers which contain polyether carbonate polyols as structural component, as well as to their preparation and to their use as the isocyanate component in one-component and two-component systems for paints, adhesives and sealants. These patent applications have in common that prepolymers having specific isocyanate end groups are used. Within the scope of the present invention, the observation has been made that such two component adhesives based on prepolymers cure to result in very soft polymers with low mechanical strength and are therefore not suitable as structural adhesives (see also Comparative Example 6 below).

In contrast to paints/varnishes and coatings, structural adhesives have to have a significantly higher internal strength cohesion and, with regard to adhesive joints of different dimensions, also have to be capable of being applied in a significantly higher layer thickness. In addition, the requirements for structural adhesives in regard to adhesion to different substrates are also significantly higher than for a paint or a coating. Furthermore, the stress imposed on a structural adhesive bond is fundamentally different from that required for paints or coatings: static loads as effected onto the bonding include compressive and tensile stress and shear and peel stress.

Furthermore, for structural adhesives, dynamic stress load is particularly relevant due to shearing or peeling movements, as well as impact and impact loads, which often are the reason for the poor applicability of structural adhesives, in particular at low temperatures. An overview of this problem can be found, for example, in Bodo Müller and Walter Rath, *Formulation of Adhesives and Sealants*, 3. Edition, Vincentz Network 2015, page 291 ff.

In summary, it can thus be concluded that the structural adhesives of the prior art do not fulfil the requirements of modern and rapid manufacturing and adhesive processes to the fullest extent.

The aim of the invention was therefore to provide a novel structural adhesive of comparatively high strength and a method for bonding substrates, wherein said adhesive and said method overcome or at least minimize the abovementioned disadvantages of the prior art.

These and other objects are achieved with the provision of the method described below and by the two-component structural adhesive described below.

In one embodiment, the present invention relates to a two-component structural adhesive which has at least the following components:
(i) at least one polyisocyanate having free isocyanate groups and having a content of aliphatically bound NCO groups of 16.0 to 24.0 wt. %, which is substantially free of ester and/or ether and/or carbonate groups,
(ii) at least one amino-functional polyaspartic acid ester of the general formula

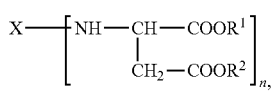

in which n=2, and X represents a divalent organic residue which can be obtained by removing the amino groups from a linear (straight-chain) or branched aliphatic diamine, having up to 9 carbon atoms, or preferably by removing the amino groups from 1,4-diaminobutane, 1,6-diaminohexane, 2,2,4-trimethyl-1,6- and/or 2,4,4-trimethyl-1,6-diaminohexane, or particularly preferred by removing the amino groups from 2-methyl-1,5-diaminopentane, wherein $R^1$ and $R^2$ are a methyl or an ethyl group, wherein the structural adhesive, in the cured state, has a tensile shear strength of at least 7 MPa, preferably at least 10 MPa, more preferably at least 12 MPa, wherein the tensile shear strength is measured according to standard DIN/EN 1465 (2009-07) between two test bodies made of roughened V2A steel.

In a further embodiment, the present invention relates to a method for the structural adhesive bonding together of identical or different substrates with two-component structural adhesives, wherein the method comprises at least the following steps:
(1) providing a two-component structural adhesive which contains at least the following components:
(i) at least one polyisocyanate having free isocyanate groups and having a content of aliphatically bound NCO groups of 16.0 to 24.0 wt. %, which is substantially free of ester and/or ether and/or carbonate groups,
(ii) at least one amino-functional polyaspartic acid ester of the general formula

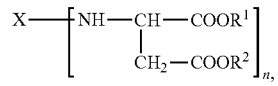

in which n=2, and X represents a divalent organic residue which can be obtained by removing the amino groups from a linear or branched aliphatic diamine having up to 9 carbon atoms, or preferably by removing the amino groups from 1,4-diaminobutane, 1,6-diaminohexane, 2,2,4-trimethyl-1,6- and/or 2,4,4-trimethyl-1,6-diaminohexane, or particularly preferred by removing the amino groups from 2-methyl-1,5-diaminopentane,
and $R^1$ and $R^2$ are a methyl or an ethyl group;
(2) structurally bonding together at least two identical or different substrates;
(3) curing the at least one adhesive bond such that, in the cured state, the same has a tensile shear strength of at least 7 MPa, preferably at least 10 MPa, more preferably at least 12 MPa, wherein the tensile shear strength is measured according to standard DIN/EN 1465 (2009-07), between two test bodies made of roughened V2A steel.

In embodiments of the present invention, "substantially free of ester and/or ether and/or carbonate groups" means that in the two-component structural adhesive, less than 15%, preferably less than 10%, particularly preferred less than 5%, in each case based on the total weight of the two-component structural adhesive, of ester-ether and/or carbonate polyols are present as a constituent of component ii), and/or are used as a reactive component in the production of isocyanate prepolymers as part of component i).

Within the scope of the present invention, the content of free isocyanate groups is determined in accordance with the standard DIN EN 1242 (2013-05).

Unless otherwise indicated, all percentages in the present disclosure relate to weight percent (wt. %), in each case based on the total weight of the structural adhesive.

In embodiments of the present invention, the two-component structural adhesive comprises, in addition to the abovementioned components (i) and (ii), at least one further component (iii) which is an adjuvant or additive of the two-component structural adhesive. Preferred adjuvants or additives are described below and in the claims.

The present invention is based, inter alia, on the observation that the two-component systems characterized in more detail here on the basis of the claimed amino-functional aspartic acid esters and the claimed aliphatic polyisocyanates are surprisingly particularly suitable as structural adhesives, since they have a particularly favourable ratio of sufficient correction time and, at the same time, rapidly achieve assembly stability. The adhesives can be applied and used in a very wide temperature window and lead to adhesive bonds with excellent tensile shear strength.

The method according to the invention and the two-component structural adhesive according to the invention are furthermore characterized in particular, by the following properties and advantages, which are achieved at least partially, preferably all in conjunction:

favorable physiological properties of the starting materials used, light and UV resistance of the resulting bonding is good, sufficient correction time while simultaneously achieving rapid assembly stability;

safely applicable in a temperature window of −10° C. to +40° C., functions reliably in a temperature range from −20° C. to 150° C.

Polyisocyanates which can be used as component i) are preferably prepared with the aid of suitable modification reactions, such as, for example, dimerization, trimerization, biuretization, allophanatization and/or urethanization of hexamethylene diisocyanate and/or isophorone diisocyanate, more preferably exclusively based on hexamethylene diisocyanate, wherein, preferably, excess monomeric diisocyanate is subsequently removed from the mixture by distillation, as a result of which the polyisocyanates preferably have residual contents of monomeric diisocyanate of preferably <0.5%, further preferably <0.3%, particularly preferred <0.1%, in each case relative to the total weight of the polyisocyanate mixture.

In embodiments of the invention, component i) has a residual content of monomeric diisocyanate of <0.5 wt. %, preferably <0.3 wt. %, particularly preferred <0.1 wt. %, in each case relative to the total weight of the polyisocyanate mixture.

Polyisocyanates which are preferably suitable as component i) are uretdione, isocyanurate, iminooxadiazine dione, urethane, allophanate, biuret and/or oxadiazine trione group-containing derivatives of HDI, which have a viscosity of 200 to 12,000 MPas at 23° C., and preferably a content of isocyanate groups of 16 to 24 wt. %, preferably 17 to 23.5 wt. % and an average isocyanate functionality of at least 2.5, preferably at least 3.0.

Suitable polyisocyanates are described by way of example in Laas et al., J Prakt Chem 336, 1994, 185-200, DE-A 1 670 666, DE-A 3 700 209, DE-A 3 900 053, EP-A 0 330 966, EP-A 0 336 205, EP-A 0 339 396 and EP-A 0 798 299.

Polyisocyanates based on hexamethylene diisocyanate with biuret structures and/or isocyanurate structures and/or iminooxadiazine dione structures are referred as component i).

In a preferred embodiment of the present invention, polyisocyanate mixtures comprising alkoxysilane groups are used as component i). Polyisocyanate mixtures of this type can be obtained by reacting polyisocyanates with functional silanes which have a functional group which can react with the isocyanate groups of the polyisocyanates, or by processes as described, by way of example, in DE 10 2009-07 047 964 A1 and DE 10 2007 032 666 A1.

The polyisocyanates which can be used according to the invention as component i) can be mixed with minor amounts of isocyanate prepolymers in order to adjust suitable mixing ratios of the ready-to-be-processed two-component mixtures.

Those isocyanate prepolymers are preferred that are known, in principle, from polyurethane technology and that are prepared by reacting aliphatic di- or polyisocyanates with relatively high-molecular-weight polyols, in particular polyether polyols, polyester polyols and/or polycarbonate polyols. In this case, preferably, only minor amounts of isocyanate prepolymers are used for mixing, the mixture corresponding to the embodiments provided above with respect to isocyanate content and residual monomer content. The amount of isocyanate prepolymers is preferably less than 20 wt. % based on the total weight of component i), preferably less than 10 wt. %, particularly preferred less than 5 wt. %.

Hardening/curing components (ii) within the scope of the present invention are amino-functional polyaspartic acid esters of the general formula

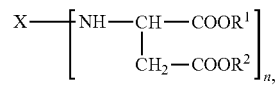

where n=2, and X is a divalent organic residue which can be obtained by removing the amino groups from a linear (straight-chain) or branched aliphatic diamine having up to 9 carbon atoms, and wherein $R^1$ and $R^2$ are a methyl or an ethyl group.

Preferably, X is a divalent organic residue which can be obtained by removing the amino groups from 1,4-diaminobutane, 1,6-diaminohexane, 2,2,4-trimethyl-1,6-diaminohexane and/or 2,4,4-trimethyl-1,6-diaminohexane, wherein $R^1$ and $R^2$ are a methyl or an ethyl group.

Preferably, X is a divalent organic residue, such as is obtainable by removing the amino groups from 1,6-diaminohexane or its isomers, where $R^1$ and $R^2$ are each an ethyl group.

In a particularly preferred embodiment, X is a divalent organic residue which can be obtained by removing the amino groups from 2-methyl-1,5-diaminopentane, where $R^1$ and $R^2$ are each an ethyl group.

The amino-functional polyaspartic acid esters (ii) are prepared by processes known per se, by reacting linear or branched aliphatic diamines such as, for example, 1,4-diaminobutane, 1,6-diaminohexane, 2,2,4-trimethyl-1,6-diaminohexane and/or 2,4,4-trimethyl-1,6-diaminohexane or 2-methyl-1,5-diaminopentane with maleic or fumaric acid esters of the general formula $R^1OOCCH=CHCOOR^2$.

Examples of preferred maleic or fumaric acid esters are dimethyl maleate and preferably diethyl maleate, and also the corresponding fumaric acid esters. Maleic acid diethyl ester is particularly preferred.

The reaction product of 1,6-diaminohexane with maleic acid diethyl ester is preferred as component ii) in the context of the present invention.

The reaction product of 2-methyl-1,5-diaminopentane with diethyl maleate is also particularly preferred as component ii) in the context of the present invention.

The preparation of the amino-functional polyaspartic acid esters (ii) from said starting materials is preferably conducted within the temperature range from 0 to 100° C., wherein the starting materials are preferably added in amounts such that at least one, preferably exactly one olefinic double bond is dispensed with for each primary amino group, wherein following the reaction, starting materials, used optionally in excess, can be separated by distillation.

The reaction can be carried out as such or in the presence of suitable solvents such as methanol, ethanol, propanol or dioxane or mixtures of such solvents, the concomitant use of solvents being less preferred.

In embodiments, the two-component structural adhesives according to the invention may contain fillers, adjuvants and additives, as advantageously used in adhesive technology, as component iii). These are, for example, inorganic and organic fillers, flame retardants, pigments, flow aids, thixotropic agents, solvents or plasticizers or (other) viscosity regulators.

Solvents can optionally be used as component iii) in small amounts, i.e. in amounts of less than 5 wt. %, as component iii), in order to improve the wetting of the base, preferably less than 2 wt. %, particularly preferred less than 1 wt. %, in each case relative to the total weight of the structural adhesive.

Suitable solvents are, in particular, commonly used organic solvents such as, for example, ethyl acetate, butyl acetate, methoxypropyl acetate, methyl ethyl ketone, methyl isobutyl ketone, toluene, xylene, aromatic or (cyclo) aliphatic hydrocarbon mixtures or any desired mixtures of such solvents.

In a preferred embodiment of the present invention, the structural adhesives comprise inorganic flame retardants and optionally also organic flame retardants as component iii).

Aluminium hydroxide and magnesium hydroxide are preferred as inorganic flame retardants, aluminium hydroxide preferably being used in powder form with particle sizes of 0.1 μm to 100 μm.

Particularly preferred organic flame retardants are phosphoric acid esters, such as triethyl phosphate, tributyl phosphate, tris-2-ethylhexyl phosphate, triphenyl phosphate, diphenyloctyl phosphate or tricresyl phosphate.

Particular preference is given to using a combination of powdered aluminium hydroxide and tris-2-ethylhexyl phosphate as flame retardant.

In addition to the flame retardants mentioned above, or instead of these, the structural adhesives can also contain fillers as component iii). Suitable fillers are sand, ground rock, quartz powder, talc, natural or ground or precipitated calcium carbonates, which may optionally be coated with fatty acids, barium sulphate ($BaSO_4$, also called baryt or heavy spar), carbon black, and silicic acids, preferably highly disperse silicic acids from pyrolysis processes.

These fillers are preferably incorporated into component ii).

Suitable pigments are, in principle, all organic and inorganic pigments known per se from coating technology, if appropriate as paste preparation, as component iii). Such pigments are preferably incorporated into component ii).

As component iii), the two-component structural adhesives may also contain reactive diluents which are preferably incorporated into component ii). Suitable reactive diluents are, for example, aspartic acid esters based on polyether amines, as disclosed in WO 2014/151307 A1.

Also suitable as reactive diluents are low molecular weight polyols known per se from polyurethane chemistry, such as, for example. 1,2-Ethanediol, 1,2-propanediol, 1,4- or 1,3-butanediol, 1,6-flexanediol, 2-ethylhexanediol-1,3, 1,8-octanediol, or dimer fatty alcohols. Also suitable are diols having ether groups, such as, for example, diethylene glycol, triethylene glycol, tetraethylene glycol, dipropylene glycol, tripropylene glycol or mixtures of such alcohols.

Said reactive diluents preferably have a mass fraction of less than 10%, preferably less than 5%, particularly preferred less than 2%, relative to the total weight of the adhesive formulation.

In order to achieve sufficient adhesion to substrates, higher molecular weight polyols of the type known from polyurethane chemistry can also be used as component iii). These are, in particular, hydroxy-functionalized polyether polyols, polyester polyols, polycarbonate polyols and polyacrylate polyols, and mixtures of the aforementioned polyols. Polyols of this type are preferably incorporated into component ii). Said polyols are preferably used in a mass fraction of less than 15%, preferably less than 10%, particularly preferred less than 5%, relative to the total weight of the adhesive formulation.

In order to achieve sufficient adhesion to specific substrates, the two-component structural adhesives according to the invention may preferably contain functional silanes as component iii). Preferred in this context are γ-organofunctional silanes or α-organofunctional silanes.

Preferred are, in particular, 3-mercaptopropyltrimethoxysilane, 3-aminopropyltrimethoxysilane, N-alkyl-3-aminopropyltrimethoxysilane, N-aminoethyl-3-aminopropyltrimethoxysilane, 3-ureidopropyltrimethoxysilane, vinyltrimethoxysilane, 3-methacryloxypropyltrimethoxysilane, 3-glycidoxypropyltrimethoxysilane and the corresponding triethoxysilane derivatives and dimethoxymethyl derivatives of the aforementioned functional silanes. Further preferred silanes are tris-[3-(trimethoxysilyl)propyl]isocyanurate and N-methyl[3-(trimethoxysilyl) propyl]carbamate, methacryloxymethyltrimethoxysilane, N-trimethoxysilylmethyl-O-methylcarbamate.

Evidently, mixtures of the aforementioned silanes or also their oligomerization products may also be used as component iii). Said functional silanes are preferably used in amounts of less than 2 wt. %, preferably less than 1 wt. %, relative to the total weight of the adhesive formulation.

In order to adjust the reaction speed, the two-component structural adhesives according to the invention may contain a catalyst as component iii). Preferred catalysts are, for example, water or tertiary amines. Further preferred catalysts within the scope of the present invention are carboxylic acids, such as, for example, formic acid, acetic acid, propionic acid or benzoic acid, and also dicarboxylic acids, such as oxalic acid or malonic acid.

In a particularly preferred embodiment of the present invention, the two-component structural adhesives according to the invention comprise water as catalyst. The two-component structural adhesives according to the invention particularly preferably comprise 0.1 wt. % to 1 wt. % of water in the context of component iii), relative to the total weight of the adhesive formulation.

In a particularly preferred embodiment of the present invention, the two-component structural adhesives comprise aliphatic polyamines as component iii). Polyamines of this type react faster than the aspartic acid esters of component ii) and are incorporated into the same. The rapid reaction of the polyamines results in rapid viscosity build-up immediately after application. Therefore, the polyamines of the type mentioned below, by way of example, may be advantageously used for rheology control. Preferred amines are, in particular, aliphatic or cycloaliphatic polyamines having primary and/or secondary amine groups.

Preferred polyamines are ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 2-methyl-1, 5-diaminopentan 1, 1

1-diaminoundecane, 1, 12-diaminododecane, 1-amino-3,3, 5-trimethyl-5-aminomethylcyclohexane, 2,4- and/or 2,6-hexahydrotoluylenediamine, 2,4'- and/or 4,4'-diaminodicyclohexylmethane or 3,3'-dimethyl-4,4'-diamino-dicyclohexyl-methane, 1,3-bis(aminomethyl). The invention also relates to polyetheramines.

Particularly preferred in this context are polyethylene polyamines such as diethylenetriamine, triethylenetetramine and/or tetraethylenepentamine and mixtures thereof.

The reaction products of said diamines with derivatives of acrylic acid and/or methacrylic acid may also be used, in principle.

Polyamines of this type are preferably used as component iii), in a mass fraction of up to 5 wt. %, particularly preferred up to 2 wt. % relative to the total weight of the adhesive formulation.

Other adjuvants and additives iii) which may be used are venting agents, defoamers, flow aids and anti-aging agents. Antioxidants, UV absorbers and free-residue scavengers and corresponding combinations of these anti-aging agents may also be used as anti-aging agents.

In the two-component structural adhesives according to the invention, components i), ii) and optionally iii) are preferably used in a quantitative ratio such that the equivalent ratio of the isocyanate groups of component (i) to the amino and/or hydroxyl groups of component ii) and iii) is from 0.9:1 to 1.4:1, preferably from 1:1 to 1.3:1.

The two-component structural adhesives according to the invention preferably have a mass fraction of from 35 to 55 wt. %, preferably from 40 to 50 wt. %. of component i), a mass fraction of from 20 to 55 wt. %, preferably from 35 to 50 wt. %. % of component ii), and a mass fraction of from 0 to 30 wt. %, preferably from 1 to 15 wt. % of the optional component iii).

The two-component structural adhesives are preferably formulated as two-component systems consisting of a resin component and a hardener component.

The formulation is preferably formulated in such a way that the resin component contains all components ii) and optional components iii). Optionally, solvents and viscosity regulators as well as anti-aging agents can be added with regard to an adjustment of the viscosities of the two components of component i), so that two-component systems are obtained corresponding to a volume ratio of from 20:80 to 80:20, preferably from 60:40 to 40:60 and particularly preferred around 50:50.

The two-component structural adhesives according to the invention are typically highly reactive and can therefore normally be processed only with the aid of suitable metering systems having two chambers. These are preferably 2K cartridge systems in conjunction with suitable static mixers, as described by way of example in WO 2011/162728 and the literature cited therein. Particularly preferred within the scope of the present invention are double-cartridge systems with child protection, as described in German Utility Model Application DE 2020/16102271 (U1).

The two-component structural adhesives according to the invention cure comparatively quickly and are formulated in such a way that they build up assembly stability in a period of 30 seconds to 5 minutes depending on the presence of catalysts of component iii), in particular water, and achieve their final strength in the period of from 3 hours to 24 hours.

Within the scope of corresponding experiments (see also examples below), it has been shown that embodiments according to the invention achieve a particularly favorable ratio of correction time to assembly stability.

Even without the addition of special adhesion promoters, such as, for example, functional silanes of the type mentioned above, the 2K compounds according to the present invention exhibit excellent adhesion on organic and inorganic substrates, in particular on wood and wood materials, steel, aluminium, concrete, glass, leather, keratin or paper, and also on plastics, in particular ABS, polycarbonate or PVC. The 2K structural adhesives according to the invention have proven to be particularly efficient for attaching plastic or wood blocks to claws of farm animals, for example cows.

The adhesion to other organic substrates, in particular plastics or inorganic substrates, in particular metals and metal alloys, can be controlled in a targeted manner by adding the substances disclosed as suitable above in the context of component iii). The present invention thus represents a substantial advance in the structural bonding of identical or different substrates.

In order to provide sufficient adhesion, it may optionally be preferred, according to the present invention, to precondition the substrate prior to application. This can be achieved by mechanical pretreatment such as, for example, roughening or grinding, but also by chemical pretreatment, such as plasma or corona pretreatment, but also by application of primers and adhesion primers.

Preferred primers are solutions of the functional silanes mentioned above as component iii) in organic solvents or solutions of chlorinated polyolefins and/or modified chlorinated polyolefins in organic solvents.

Such solutions of chlorinated polyolefins are particularly advantageous as primers if sufficient adhesion to nonpolar plastics, in particular polyolefin plastics such as, for example, polypropylene is to be achieved. Chlorinated polyolefins or modified chlorinated polyolefins preferably have a chlorine content of from 10 to 25 wt. % based on the solids content of the chlorinated polyolefins. The chlorinated polyolefins or modified chlorinated polyolefins used preferably have a number-average molecular weight of 8,000 to 50,000. The weight fraction of chlorinated polyolefins used in the primer formulation is preferably from 0.2 to 5.0 wt. % in each case relative to the total weight of the primers and the solids content of the chlorinated polyolefins.

The chlorinated polyolefins used according to the invention are known to the person skilled in the art and are commercially available, for example, under the trade names Eastman™ chlorinated polyolefins from Eastman Chemical Products, Inc., Trapylene from Tramaco or Hardlen from Toyo Kasei.

The two-component structural adhesives according to the present invention can be set to a low viscosity to high viscosity with regard to the processing viscosity. They preferably have, at a temperature of 23° C. a viscosity, immediately after mixing, in the range of from 200 MPa·s to 100 000 MPa·s, preferably from 500 MPa·s to 50 000 MPa·s, the viscosity being determined in a rotational viscometer according to DIN EN ISO 3219.

Low-viscosity formulations are used if substrates are to be adhesively bonded in a quasi-gap-free manner, ie with a gap dimension of less than 0.1 mm while higher-viscosity formulations are used if it is intended to bond with a larger gap dimension.

In the context of the present invention, the observation has been made that adhesive bonds with surprisingly high internal strengths can be obtained according to the invention, so that adhesive bonds with high strength can be obtained at a gap size of 0.1 mm to 3 mm.

In the process according to the invention, the two-component structural adhesives can be processed in a substantially larger temperature window than two-component structural adhesives of the prior art. The two-component structural adhesives according to the invention cure reliably in a temperature range from −20° C. to +50° C. The cured adhesives furthermore exhibit superior impact strength at low temperatures of up to −40° C. and, at the same time, have an excellent high-temperature resistance in the temperature range up to 150° C.

The following examples of formulations of structural adhesives are intended to illustrating the invention in more detail, but without limiting same. A comparison of the examples according to the invention with non-inventive examples is intended to illustrate the technical advantages of the method according to the invention and of the cured structural adhesive.

EXAMPLE 1

Production of a Two-Component Structural Adhesive (According to the Invention)
Component A [Component i)]
Polyisocyanurate polyisocyanate based on hexamethylene diisocyanate with an NCO content of 23% and a viscosity of 2900 MPas (23° C.), residual monomer content <0.1%, Desmodur Ultra N3300, commercial product from Covestro AG, Leverkusen

| Component B | [mixture of components ii) and iii)] |
|---|---|
| 97.5 wt. % | polyaspartic acid esters based on 1,6-diaminohexane and maleic acid diethyl ester, [component ii)] |
| 0.5 wt. % | demineralized water [component iii)] |
| 2 wt. % | 3,3'-dimethyl-4,4'-diamino-dicyclohexylmethane, laromin C260, commercial product from BASF AG, Ludwigshafen [component iii)] |

The two components A and B are filled into a 2K cartridge-Sulzer Mixpac 2K Adhesive A System, from Sulzer Mixpac AG, Haag Switzerland. The application is carried out in a volume ratio of 1:1 using a static Sulzer 2K mixer MAH 06-21 T from Sulzer Mixpac AG.

This structural adhesive according to the invention hardens reliably even at a temperature of −18° C. within 24 hours.

EXAMPLE 2

Production of a Two-Component Structural Adhesive (According to the Invention)
Component A [Component i)]
Polyisocyanate based on hexamethylene diisocyanate with iminooxadiazine dione structure and an NCO content of 23.5% and a viscosity of 700 MPas (23° C.), residual monomer content <0.3%, Desmodur N3900, commercial product from Covestro AG, Leverkusen

| Component B | [mixture of components ii) and iii)] |
|---|---|
| 95 wt. % | polyaspartic acid esters based on 2-methyl-1, 5-diaminopentan and maleic acid diethyl ester, Desmophen NH1220, commercial product from Covestro AG, Leverkusen [component ii)] |
| 1 wt. % | 3-glycidoxypropyltrimethoxysilane [component iii)] |
| 4 wt. % | butane diol-1, 4 [component iii)] |

The two components A and B are filled in a 2K cartridge-Sulzer Mixpac 2K Adhesive A System, supplied by Sulzer Mixpac AG, Haag Switzerland. The application is carried out in a volume ratio of 1:1 by using a static Sulzer 2K mixer MAH 06-21 T from Sulzer Mixpac AG.

This structural adhesive according to the invention hardens reliably even at a temperature of −18° C. within 24 hours.

EXAMPLE 3

Production of a Two-Component Structural Adhesive (According to the Invention)
Component A [Component i)]
Commercially available polyisocyanate based on hexamethylene diisocyanate with biuret structure and an NCO content of 22% and a viscosity of 8000 MPas (23° C.), Desmodur N100, residual monomer content <0.3%, commercial product from Covestro AG, Leverkusen

| Component B | [mixture of components ii) and iii)] |
|---|---|
| 92.5 wt. % | polyaspartic acid esters based on 2-methyl-1, 5-diaminopentan and maleic acid diethyl ester, Desmophen NH1220, commercial product from Covestro AG, Leverkusen [component ii) ] |
| 5 wt. % | highly disperse silica (HDK H18 from Wacker Chemie AG, Burghausen [component iii)] |
| 2 wt. % | 1-amino-3,3,5-trimethyl-5-aminomethylcyclohexane (Vestamine IPD from Evonik AG Essen), [component iii)] |
| 0.5 wt. % | demineralized water [component iii)] |

The two components A and B are filled into a 2K cartridge-Sulzer Mixpac 2K Adhesive A System, from Sulzer Mixpac AG, Haag Switzerland. The application is carried out in a volume ratio of 1:1 using a static Sulzer 2K mixer MAH 06-21 T from Sulzer Mixpac AG.

This structural adhesive according to the invention hardens reliably even at a temperature of −18° C. within 24 hours.

EXAMPLE 4

Production of a Two-Component Structural Adhesive (According to the Invention)

| Component A | [component i), mixture of two polyisocyanates] |
|---|---|
| 60 wt. % | polyisocyanurate polyisocyanate based on hexamethylene diisocyanate with an NCO content of 23% and a viscosity of 900 MPas (23° C.), Desmodur N3600, commercial product from Covestro AG, Leverkusen are mixed with |
| 40 wt. % | polyester-modified polyisocyanurate polyisocyanate the invention relates to a base of hexamethylene diisocyanate having an NCO content of 11%, a viscosity of 6000 MPas (23° C.) and a polyester content of 45 wt. %, Desmodur N3800, commercial product from Covestro AG, Leverkusen |

| Component B | [mixture of components ii) and iii) ] |
|---|---|
| 80 wt. % | polyaspartic acid esters based on 2-methyl-, 5-diaminopentan and Maleic acid diethyl ester, Desmophen NH1220, commercial product from Covestro AG, Leverkusen [component ii)] |
| 20 wt. % | Martinal OL 104 LEO (precipitated aluminium hydroxide from Huber, Martineswerk GmbH, Bergheim [component iii)] |

The two components A and B are filled into a 2K cartridge-Sulzer Mixpac 2K Adhesive A System, from Sulzer Mixpac AG, Haag Switzerland. The application is carried out in a volume ratio of 1:1, using a static Sulzer 2K mixer MAH 06-21 T from Sulzer Mixpac AG.

This structural adhesive according to the invention also cures at a temperature of −18° C. within 24 hours.

Comparison of the Adhesive Properties

The two-component adhesives were applied to roughened V2A steel test bodies having a length of 100 mm and a width of 25 mm on one side in order to determine the tensile shear strengths in accordance with the DIN/EN 1465 (2009-07), and then adhesively bonded to the respectively applied gap dimension over an overlap length of 12 mm. The correction time was determined as the time in which the two bonded test bodies can still be displaced manually without expenditure of force. The assembly stability was determined as the time after which the bonded test bodies can be loaded with a mass of 1 kg at one end with horizontal fixing.

The tensile shear strength was determined with the aid of a tensile testing machine (Shimadzu, AGS-X HC 20 KN) after a time interval of 48 hours (22° C., 40% rel. atmospheric humidity, test speed 2 mm/minute). The values for the tensile strengths given in the table below were determined as the mean value, measured on three test bodies in each case.

TABLE 1

Comparison of adhesive data

| | Example 1 | Example 2 | Example 3 | Example 4 |
|---|---|---|---|---|
| Correction time (23° C.) | 35 sec | 180 sec | 30 sec | 220 sec |
| Assembly stability (23'° C.) | 150 sec | 540 sec | 140 sec | 500 sec |
| Tensile shear strength (Beech wood) | 7.6 MPa 8.4 MPa (no/1 mm gap) | 9.2 MPa 11.0 MPa (no/1 mm gap) | 7.9 MPa 8.6 MPa (no/1 mm gap) | 7.0 MPa 7.4 MPa (no/1 mm gap) |
| Tensile shear strength (Roughened V2A-steel) | 12.2 MPa 13.5 MPa (no/1 mm gap) | 16.4 MPa 16.4 MPa (no/1 mm gap) | 12.5 MPa 13.2 MPa (no/1 mm gap) | 10.0 MPa 10.4 MPa (no/1 mm gap) |
| Tensile shear strength (Roughened aluminum) | 11.6 MPa 11.8 MPa (no/1 mm gap) | 14.2 MPa 14.8 MPa (no/1 mm gap) | 11.6 MPa 12.2 MPa (no/1 mm gap) | 10.2 MPa 11.0 MPa (no/1 mm gap) |
| Tensile shear strength (ABS, precleaned with isopropanol) | 7.2 MPa 8.0 MPa (no/1 mm gap) | 10.2 MPa 10.5 MPa (no/1 mm gap) | 9.4 MPa 10.0 MPa (no/1 mm gap) | 7.0 MPa 7.5 MPa (no/1 mm gap) |
| Tensile shear strength (Polycarbonate, precleaned with isopropanol) | 7.6 MPa 7.8 MPa (no/1 mm gap) | 9.8 MPa 10.0 MPa (no/1 mm gap) | 7.4 MPa 7.2 MPa (no/1 mm gap) | 7.5 MPa 7.9 MPa (no/1 mm gap) |
| Tensile shear strength (PVC (hard), precleaned with isopropanol) | 8.4 MPa 8.8 MPa (no/1 mm gap) | 11.2 MPa 11.0 MPa (no/1 mm gap) | 9.2 MPa 9.5 MPa (no/1 mm gap) | 7.8 MPa 8.6 MPa (no/1 mm gap) |

EXAMPLE 5

Comparative Example

V2A test specimens were bonded according to the statements made above using a commercially available two-component polyurethane adhesive Easy-Mix PU-90, polyurethane adhesive from Weicon GmbH, Munster. This adhesive has a correction time of 70 sec at 23° C. and an assembly strength of 9 minutes. The ratio of the correction time to the assembly strength is thus considerably less favorable.

In the case of an adhesive test at a temperature of 0° C. this adhesive no longer cured.

EXAMPLE 6

Comparative Example (Analogous to WO 2009-07/003596)

166 g of the prepolymer from Example A1 of WO 2009-07/003596 was intimately mixed with 23.4 g of the polyaspartic acid ester based on 2-methyl-1,5-diamopentane and maleic acid diethyl ester, Desmophen NH1220, commercial product from Covestro AG, Leverkusen [component ii)] in a plastic beaker. The mixture was processed for 5 minutes at 23° C. Using the fresh mixture, V2A test specimens were bonded in accordance with the procedure described above without a gap ("no gap") and with a gap width of 1 mm. This adhesive was allowed a correction time of 300 sec at 23° C. and an assembly strength of 50 minutes. The tensile shear strength was determined with the aid of a tensile testing machine after a time of 48 hours. The tensile strengths were determined as the mean value, measured on in each case three test bodies, using:

2,9 MPa (without gap)
2,7 MPa (1 mm gap width)

This flexible adhesive is thus unsuitable for producing structural adhesives.

The invention claimed is:

1. A two-component structural adhesive comprising at least the following components,
  (i) at least one polyisocyanate having free isocyanate groups and having a content of aliphatically bound NCO groups of 16.0 to 24.0 wt. %, which is substantially free of ester and/or ether and/or carbonate groups,
  (ii) at least one amino-functional polyaspartic acid ester of the general formula

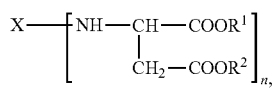

in which n=2, and X represents a divalent organic residue obtained by removal of the amino groups from 1, 6-diaminohexane, from 2-methyl-1, 5-diaminopentane or from a linear or branched aliphatic diamine having up to 9 carbon atoms, wherein $R^1$ and $R^2$ are a methyl or an ethyl group, wherein the structural adhesive, in the cured state, has a tensile shear strength of at least 7 MPa, wherein the tensile shear strength is measured according to standard DIN/EN 1465 (2009-07) between two test bodies made of roughened V2A steel.

2. A method for the structural adhesive bonding together of identical or different substrates with two-component structural adhesives, wherein the method comprises at least the following steps:

(1) providing a two-component structural adhesive which contains at least the following components:
   (i) at least one polyisocyanate having free isocyanate groups and having a content of aliphatically bound NCO groups of 16.0 to 24.0 wt. %, which is substantially free of ester and/or ether and/or carbonate groups,
   (ii) at least one amino-functional polyaspartic acid ester of the general formula

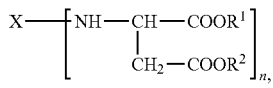

in which n=2, and X represents a divalent organic residue obtained by removal of the amino groups from 1, 6-diaminohexane, from 2-methyl-1, 5-diaminopentane or from a linear or branched aliphatic diamine having up to 9 carbon atoms,
and $R^1$ and $R^2$ are a methyl or an ethyl group;

(2) structurally bonding together at least two identical or different substrates;

(3) curing the at least one adhesive bond such that, in the cured state, the same has a tensile shear strength of at least 7 MPa, wherein the tensile shear strength is measured according to standard DIN/EN 1465 (2009-07), between two test bodies made of roughened V2A steel.

3. The structural adhesive of claim 1, wherein i) contains:
i)
at least one polyisocyanate having free isocyanate groups and based on hexamethylene diisocyanate having a content of aliphatically bound NCO groups of 17.0 to 23.5 wt. %, which is substantially free of ester and/or ether and/or carbonate groups.

4. The structural adhesive of claim 3 wherein i) contains
i)
at least one polyisocyanate mixture comprising alkoxysilane groups.

5. The structural adhesive of claim 1, wherein ii) contains:
ii) at least one amino-functional polyaspartic acid ester of the abovementioned formula, in which n=2 and X is a divalent organic residue, which is obtained by removal of the amino groups from 1, 6-diaminohexane or by removal of the amino groups from 2-methyl-1, 5-diaminopentane, and wherein $R^1$ and $R^2$ are an ethyl group.

6. The structural adhesive of claim 1, characterized in that the two-component structural adhesive contains at least one further component iii) comprising water.

7. The structural adhesive of claim 6, characterized in that component iii) further comprises:
aliphatic and/or cycloaliphatic diamines,
at least one adhesion promoter,
an inorganic and/or organic flame retardant,
disperse silicic acid, or
a polyol.

8. The structural adhesive of claim 1, characterized in that the two components i) and ii) of the structural adhesive are used in a volume ratio of from 60:40 to 40:60.

9. The method of claim 2, characterized in that the two components in step (2) are applied to two substrate surfaces with the aid of a 2K cartridge system with static mixer.

10. A substrate, object, or article comprising the structural adhesive of claim 1, wherein the structure, object or article is adhesively bonded with the structural adhesive, and wherein the structural adhesive is cured.

11. The structural adhesive of claim 6, characterized in that the two components i) and ii), where ii) contains component iii), are used in a volume ratio of 50:50.

12. The structural adhesive of claim 1, wherein the divalent organic residue is obtained by removing the amino groups from a linear or branched aliphatic diamine having up to 9 carbon atoms.

13. The structural adhesive of claim 1, wherein the divalent organic residue is obtained by removing the amino groups from 1, 4-diaminobutane, 1, 6-diaminohexane,2,2,4-trimethyl-1, 6 and/or 2,4,4-trimethyl-1, 6-diaminohexane.

14. The structural adhesive of claim 1, wherein the divalent organic residue is obtained by removing the amino groups from 2-methyl-1, 5-diaminopentane.

15. The structural adhesive of claim 1, wherein the tensile shear strength is at least 10 MPa.

16. The structural adhesive of claim 1, wherein the tensile shear strength is at least 12 MPa.

17. The method of claim 2, wherein the divalent organic residue is obtained by removing the amino groups from a linear or branched aliphatic diamine having up to 9 carbon atoms.

18. The method of claim 2, wherein the divalent organic residue is obtained by removing the amino groups from 1, 4-diaminobutane, 1, 6-diaminohexane,2,2,4-trimethyl-1, 6 and/or 2,4,4-trimethyl-1, 6-diaminohexane.

19. The method of claim 2, wherein the divalent organic residue is obtained by removing the amino groups from 2-methyl-1, 5-diaminopentane.

20. The method of claim 2, wherein the tensile shear strength is at least 10 MPa.

21. The method of claim 2, wherein the tensile shear strength is at least 12 MPa.

* * * * *